United States Patent [19]

Hinchman et al.

[11] 3,710,387
[45] Jan. 9, 1973

[54] F.M. RADAR RANGE SYSTEM

[75] Inventors: Walter R. Hinchman, Riverside; Donald J. Adrian, Corona; Andrew W. Walters, Riverside, all of Calif.

[73] Assignee: The United States of America as represented by the Secretary of the Navy

[22] Filed: Sept. 6, 1960

[21] Appl. No.: 54,326

[52] U.S. Cl. ................ 343/12 R, 343/7.3, 343/14, 343/100 CL
[51] Int. Cl. .................. G01s 9/04, G01s 9/24
[58] Field of Search ............... 343/100.7, 14, 12

[56] References Cited

UNITED STATES PATENTS

| | | | |
|---|---|---|---|
| 2,253,975 | 8/1941 | Guanella | 343/100.7 |
| 2,941,202 | 6/1960 | Harris, Jr. et al. | 343/100.7 |

FOREIGN PATENTS OR APPLICATIONS

| | | | |
|---|---|---|---|
| 724,555 | 2/1955 | Great Britain | 343/100.7 |

Primary Examiner—Malcolm F. Hubler
Attorney—Joseph M. St. Amand, Thomas M. Phillips and W. O. Quesenberry

EXEMPLARY CLAIM

1. In a random modulated radar system utilizing carrier correlation the combination comprising a source of unmodulated radio frequency signal, a first modulator coupled to said signal source having an input and an output, a second modulator coupled to said signal source having an input and an output, noise generator means for generating a non-periodic signal directly coupled to the input of said first modulator for frequency modulating the signal coupled thereto with said non-periodic signal, antenna means coupled to the output of said first modulator for transmitting the non-periodic frequency modulated signal to a target, variable delay means coupling said noise generator to the input of said second modulator for frequency modulating the signal coupled thereto with a delayed non-periodic signal, mixer means having two inputs and an output, the output of said second modulator being coupled to one of the inputs of said mixer, antenna means for receiving a signal from said target being coupled to the other input of said mixer and doppler amplifier means coupled to the output of said mixer for producing a maximum output signal when there is unity correlation between the two inputs to said mixer.

3 Claims, 3 Drawing Figures

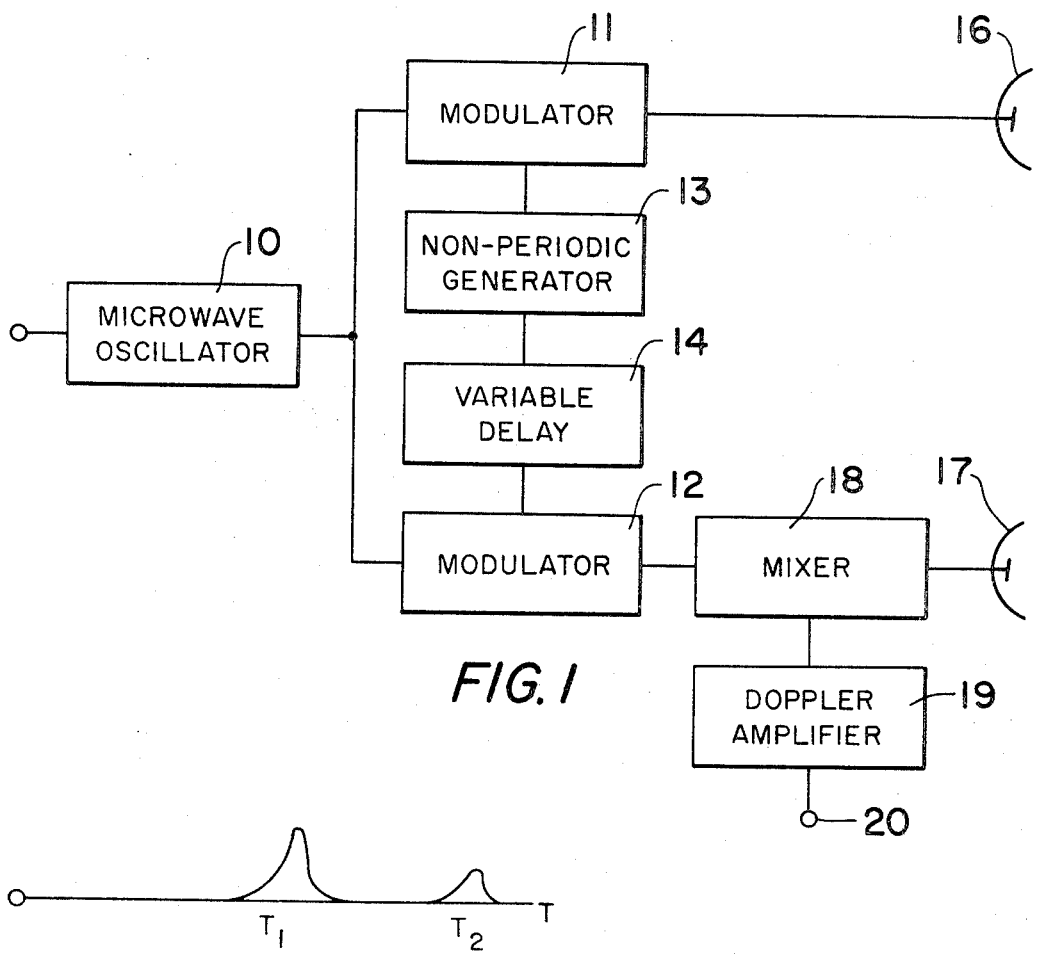
FIG. 1
FIG. 2
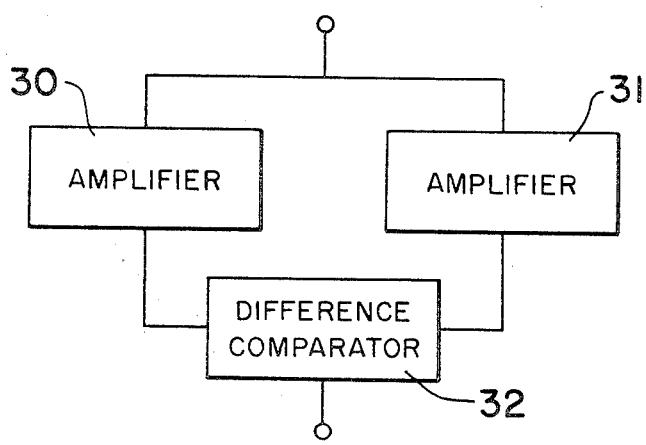
FIG. 3
WALTER R. HINCHMAN
DONALD J. ADRIAN
ANDREW W. WALTERS
*INVENTORS*
BY
*ATTORNEYS*

F.M. RADAR RANGE SYSTEM

The invention herein described may be manufactured and used by or for the Government of the United States of America for governmental purposes without the payment of any royalties thereon or therefor.

The present invention relates to a radar system and more particularly to a radar system in which the transmitted radio frequency energy is frequency modulated by a non-periodic generator.

Various types of acquisition and tracking radar systems have been developed employing periodic modulation of some type. However, the use of such periodic modulation results in a periodic range response, making the radar susceptible to certain types of repeat jamming techniques. Complex systems have been proposed which employ random modulation utilizing frequency amplitude and modulation with noise correlation.

The present application discloses a simple system which utilizes carrier correlation. The system employs a single source of an unmodulated radio frequency signal which is split in a directional coupler and fed to two separate modulators. The output of a nonperiodic generator (noise) is used to frequency modulate the transmitted signal directly, while a portion of this noise signal is coupled through a variable delay circuit and used to frequency modulate the other portion of the split signal. This modulated signal is then mixed with the target reflected signal in a microwave mixer. The output will be the autocorrelation function of the modulated radio frequency signal. When the variable delay equals the time delay of a reflected signal there will be unity correlation and maximum signal output. The signal output will fall off rapidly and monotonically as the variable delay becomes either greater or less than the time delay of the reflected signal, i.e., there exists a range gate. The width of this range gate is inversely proportional to the RMS carrier deviation and may be controlled by varying the modulating voltage.

An object of the present invention is the provision of an improved and simplified continuous wave radar system.

Another object is to provide an improved continuous wave radar system which utilizes carrier correlation.

A further object of the invention is the provision of an improved continuous wave radar system which provides sea and chaff discrimination by spectral comparison.

Still another object is to provide an improved continuous wave radar system which provides means for varying range gate width to determine depth and extent of target for obtaining chaff and decoy discrimination, and Still a further object of the invention is the provision of a continuous wave radar system wherein power splitting and dual modulators are used to obtain the effect of separate synchronized oscillators.

Other objects and many of the attendant advantages of this invention will become readily appreciated as the same becomes better understood by reference to the following detailed description when considered in connection with the accompanying drawings wherein:

FIG. 1 shows a block diagram of one embodiment of the invention.

FIG. 2 shows a diagram of a display of separate targets which might appear on a radarscope, and FIG. 3 shows a modification of the embodiment of FIG. 1.

Referring now to the drawings, there is shown in FIG. 1 a radar system having a microwave oscillator 10 having an output coupled through a directional coupler (not shown) to dual modulators 11 and 12. Non-periodic generator 13 is coupled directly to modulator 12 and through a variable delay 14 to modulator 12. The output of modulator 11 is coupled to transmitting antenna 16 and the output of modulator 12 is coupled as an input to mixer 18. Coupled as another input to mixer 18 is receiving antenna 17. The output of mixer 18 is coupled to doppler amplifier 19.

In understanding the operation of the invention, it is assumed that the radar system is mounted in an airborne vehicle.

In operation an unmodulated radio frequency signal generated by oscillator 10 is split and fed to modulators 11 and 12. These modulators may be traveling wave tube amplifiers, ferrite modulators, klystron amplifiers, or any device capable of frequency modulating a microwave passing through it. The signal passing through modulator 11 is modulated by a noise signal from non-periodic generator 13 and transmitted to a target (not shown) by antenna 16. The signal passing through modulator 12 is modulated by a portion of the noise signal generated by generator 13 except that it has been delayed by variable delay network 14. The output signal from modulator 12 is mixed with a target reflected signal from antenna 17 in a microwave balanced mixer 18. The output of mixer 18 is passed through doppler amplifier 19 to standard radar display circuitry (not shown). The output from amplifier 19 is the autocorrelation function of the modulated radio frequency signal. When the variable delay of the noise signal is equal to the delay of the reflected signal, the output of mixer 18 will be at a maximum. The outputs representing distances to two different targets would appear as shown in FIG. 2.

To use this system as a tracking radar, suitable servomechanisms may be employed to adjust the variable delay of delay network 14 so as to provide a moving range gate containing the desired target and eliminating unwanted targets or radar jammers.

In the presence of sea return interference with airborne radar, doppler amplifier 19 may be replaced by the alternate detector arrangement shown in FIG. 3. The output of mixer 18 is coupled through linear amplifiers 30 and 31 to provide two inputs to comparator 32. The signal level in the doppler pass band is compared with that in an adjacent band having the same handwidth. For example, the doppler pass band for amplifier 30 may be 0–50 kc and 50–100 kc for amplifier 31. The output of comparator 32 is the difference between the two signals, i.e., a difference in the relative amplitudes of the envelopes of the output signals from amplifiers 30 and 31. Since sea return is generally rather extensive in range, the sea return in adjacent bands will tend to cancel out, leaving only the target signal.

Obviously many modifications and variations of the present invention are possible in the light of the above teachings. It is therefore to be understood that within the scope of the appended claims the invention may be practiced otherwise than as specifically described.

What is claimed is:

1. In a random modulated radar system utilizing carrier correlation the combination comprising a source of unmodulated radio frequency signal, a first modulator coupled to said signal source having an input and an output, a second modulator coupled to said signal source having an input and an output, noise generator means for generating a non-periodic signal directly coupled to the input of said first modulator for frequency modulating the signal coupled thereto with said non-periodic signal, antenna means coupled to the output of said first modulator for transmitting the non-periodic frequency modulated signal to a target, variable delay means coupling said noise generator to the input of said second modulator for frequency modulating the signal coupled thereto with a delayed non-periodic signal, mixer means having two inputs and an output, the output of said second modulator being coupled to one of the inputs of said mixer, antenna means for receiving a signal from said target being coupled to the other input of said mixer and doppler amplifier means coupled to the output of said mixer for producing a maximum output signal when there is unity correlation between the two inputs to said mixer.

2. The system of claim 1 wherein said doppler amplifier means comprises first and second amplifiers each having their inputs coupled to the output of said mixer, and difference comparator means having the outputs of said amplifiers coupled as inputs thereto.

3. A radar system having oscillator means for generating a radio frequency signal, first modulator means coupled to said oscillator means for modulating said signal with a non-periodic signal, second modulator means coupled to said oscillator means for modulating said signal with a delayed non-periodic signal, transmitting means for transmitting said first modulated signal, receiving means for receiving an echo of said transmitted signal, and means coupled to said second modulating means and to said receiving means for generating a maximum output signal when the delay of said delayed modulated signal is equal to twice the transit time of said echo signal.

* * * * *